US008919844B1

(12) United States Patent
Mascorro et al.

(10) Patent No.: US 8,919,844 B1
(45) Date of Patent: Dec. 30, 2014

(54) GRIPPER WITH ACTUATOR MOUNTED DISPLACEMENT SENSOR

(71) Applicant: Norgren Automation Solutions, LLC, Saline, MI (US)

(72) Inventors: Shawn Paul Mascorro, Royal Oak, MI (US); Richard Hamann, Ann Arbor, MI (US); Mark A. Holcomb, Tecumseh, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 0 days.

(21) Appl. No.: 13/896,641

(22) Filed: May 17, 2013

Related U.S. Application Data

(60) Provisional application No. 61/648,652, filed on May 18, 2012.

(51) Int. Cl.
*B25J 13/08* (2006.01)
*B25J 15/00* (2006.01)

(52) U.S. Cl.
CPC .......... *B25J 15/0028* (2013.01); *Y10S 294/907* (2013.01); *Y10S 901/35* (2013.01); *Y10S 901/46* (2013.01)
USPC ........... 294/197; 294/192; 294/203; 294/907; 901/35; 901/46

(58) Field of Classification Search
USPC ......... 294/197, 192, 203, 907, 201, 207, 115, 294/116; 901/35, 46, 32, 37; 269/32, 34; 324/207.15
See application file for complete search history.

(56) References Cited

U.S. PATENT DOCUMENTS

| | | | | | |
|---|---|---|---|---|---|
| 4,456,293 | A | * | 6/1984 | Panissidi | 294/106 |
| 4,682,805 | A | * | 7/1987 | Reynolds | 294/86.4 |
| 4,723,503 | A | * | 2/1988 | Yuda | 294/198 |
| 5,090,757 | A | * | 2/1992 | Huber et al. | 294/207 |
| 5,383,697 | A | | 1/1995 | Roudaut | |
| 5,647,625 | A | * | 7/1997 | Sawdon | 294/86.4 |

(Continued)

FOREIGN PATENT DOCUMENTS

SU 1743857 6/1992

OTHER PUBLICATIONS

Database WPI, Week 199327, Thomas Scientific, 1993-217931, XP002473315, London, GB.

(Continued)

*Primary Examiner* — Paul T Chin
(74) *Attorney, Agent, or Firm* — Young Basile Hanlon & MacFarlane P.C.

(57) ABSTRACT

A gripper assembly includes an actuator, at least one gripper jaw, a sensor member and at least one position sensing device. The actuator has a first actuator portion, a second actuator portion, and a fixed portion. The first actuator portion and the second actuator portion are moveable in unison between a first position and a second position. The at least one gripper jaw is disposed forward of the fixed portion of the actuator and is moveable with respect to the fixed portion of the actuator in response to movement of the first actuator portion. The sensor member is disposed rearward of the fixed portion of the actuator and is coupled to the second actuator portion for movement therewith. The position sensing device is disposed rearward of the fixed portion of the actuator and is operable to detect proximity of the sensor member.

20 Claims, 6 Drawing Sheets

(56) References Cited

U.S. PATENT DOCUMENTS

| | | |
|---|---|---|
| 6,605,939 B1 | 8/2003 | Jansseune et al. |
| 6,641,189 B2 | 11/2003 | Moilanen et al. |
| 6,714,004 B2 | 3/2004 | Jagiella |
| 8,104,810 B2 | 1/2012 | Holcomb et al. |
| 2003/0151402 A1 | 8/2003 | Kindler |
| 2005/0253576 A1 | 11/2005 | Nyce |
| 2006/0238189 A1* | 10/2006 | Holcomb et al. ........ 324/207.16 |

OTHER PUBLICATIONS

International Search Report and Written Opinion dated Apr. 3, 2008.
International Search Report and Written Opinion dated Oct. 15, 2008.

* cited by examiner

GRIPPER WITH ACTUATOR MOUNTED DISPLACEMENT SENSOR

CROSS-REFERENCE TO RELATED APPLICATIONS

This application claims the benefit of U.S. Provisional Patent Application No. 61/648,652, which was filed on May 18, 2012, and is incorporated herein by reference in its entirety.

BACKGROUND

This disclosure relates in general to automated handling equipment such as grippers and clamps.

Automated handling equipment can be used in industrial settings for transferring workpieces between workstations or for clamping a workpiece in place at a workstation. Such automated handling equipment can include one or more grippers that clamp onto the workpiece while moving it between the stations. Conventional grippers can include an actuator that moves one or more gripper jaws between open and closed positions.

Mechanical and electrical sensors have been utilized to detect the jaw position of grippers. Such sensors are typically installed in proximity of the jaws. In some situations, locating a sensor near the moving jaw of a gripper or clamp can cause unintended effects. As one example, the motion of the moving jaw might interfere with operation of the sensor. As another example, environmental conditions near the gripper jaw, such as intense heat, might be detrimental to the sensor.

SUMMARY

One aspect of the disclosed embodiments is a gripper assembly that includes an actuator, a gripper jaw, a sensor member and a position sensing device. The actuator has a first actuator portion, a second actuator portion, and a fixed portion. The first actuator portion and the second actuator portion are moveable in unison between a first position and a second position. The gripper jaw is disposed forward of the fixed portion of the actuator and is moveable with respect to the fixed portion of the actuator in response to movement of the first actuator portion. The sensor member is disposed rearward of the fixed portion of the actuator and is coupled to the second actuator portion for movement therewith. The position sensing device is disposed rearward of the fixed portion of the actuator and is operable to detect proximity of the sensor member.

Another aspect of the disclosed embodiments is a gripper assembly that includes a pneumatic actuator, a gripper body, a gripper jaw, a sensor member, a sensor mount, and a position sensing device. The pneumatic actuator includes an actuator housing, a piston disposed within the actuator housing, a first actuator rod portion that is coupled to the piston and extends forward from a front portion of the actuator housing, and a second actuator rod portion that is coupled to the piston and extends rearward from a rear portion of the actuator housing. The first actuator rod portion and the second actuator rod portion are moveable in unison between a first position and a second position. The gripper body is fixedly connected to the actuator housing. The gripper jaw is pivotally connected to the gripper body and is moveable with respect to the gripper body in response to movement of the first actuator rod portion between the first position and the second position. The sensor member is disposed rearward of the actuator housing and is coupled to the second actuator portion for movement therewith. The sensor mount is fixedly connected to the actuator housing. The position sensing device is connected to the sensor mount and is operable to detect proximity of the sensor member.

Another aspect of the disclosed embodiments is a gripper assembly that includes an actuator, a gripper jaw, a sensor member, a position sensing device, and a cooling port. The actuator is moveable between a first position and a second position. The gripper jaw is coupled to at least a portion of the actuator for movement in response to movement of the actuator. The sensor member is coupled to at least a portion of the actuator for movement in response to movement of the actuator. The position sensing device is operable to detect proximity of the sensor member. The cooling port is operable to direct a stream of gas toward at least a portion of the position sensing device for dissipating heat from the position sensing device.

BRIEF DESCRIPTION OF THE DRAWINGS

The various features, advantages and other uses of the present apparatus will become more apparent by referring to the following detailed description and drawing in which.

DETAILED DESCRIPTION

The disclosure herein is directed, in part, to grippers or clamps that include one or more sensors that detect the position of a moving jaw of the gripper or clamp at a location that is remote from the moving jaw. As one example, the position of the jaw can be expressed as the degree to which the jaw is open. As another example, the position of the jaw can be expressed in terms of one or more predetermined positions, such as a fully open position and a fully closed position. As another example, the position of the jaw can be expressed as a distance between the jaw and opposed fixed surface or as a distance between the jaw and another jaw.

In one example, an actuator rod of a pneumatic actuator has a first end that is coupled to a gripper jaw, and a second end that includes a portion, such as a sensor member, that is detected by a position sensing device. The actuator rod is moved between first and second positions (e.g. extended and retracted positions) by an actuator that is disposed between the first end of the actuator rod and the second end of the actuator rod. As the actuator rod moves, the sensor member moves in unison with the actuator rod, and the position sensing device outputs a signal that corresponds to the position of the sensor member.

Figure 1A:
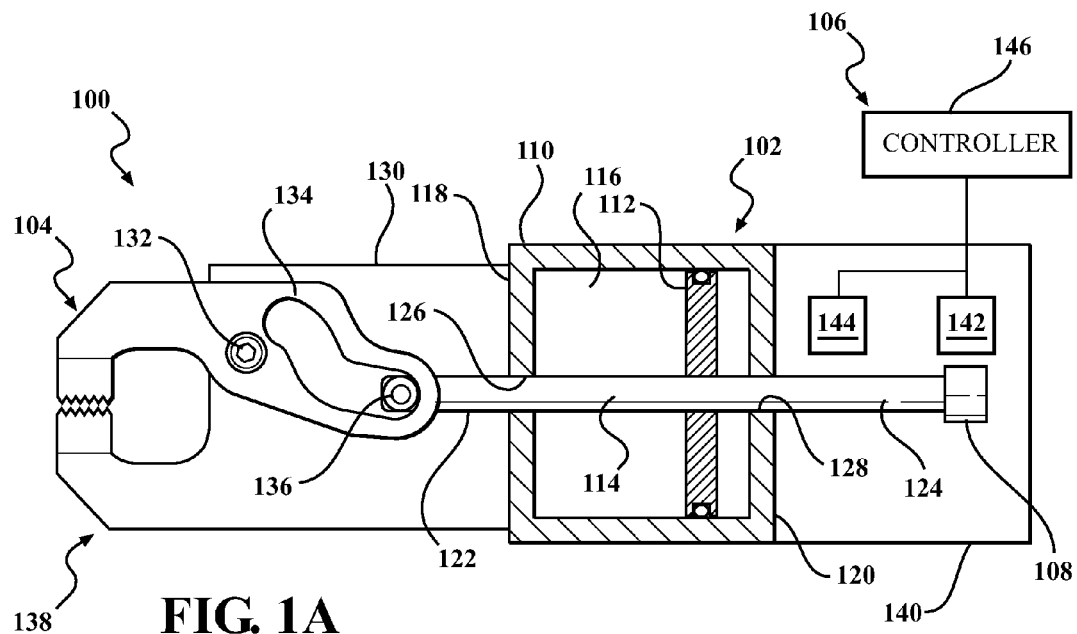
FIGS. 1A-1B are illustrations showing a gripper assembly that incorporates a position sensing device according to a first example.
Figure 1B:
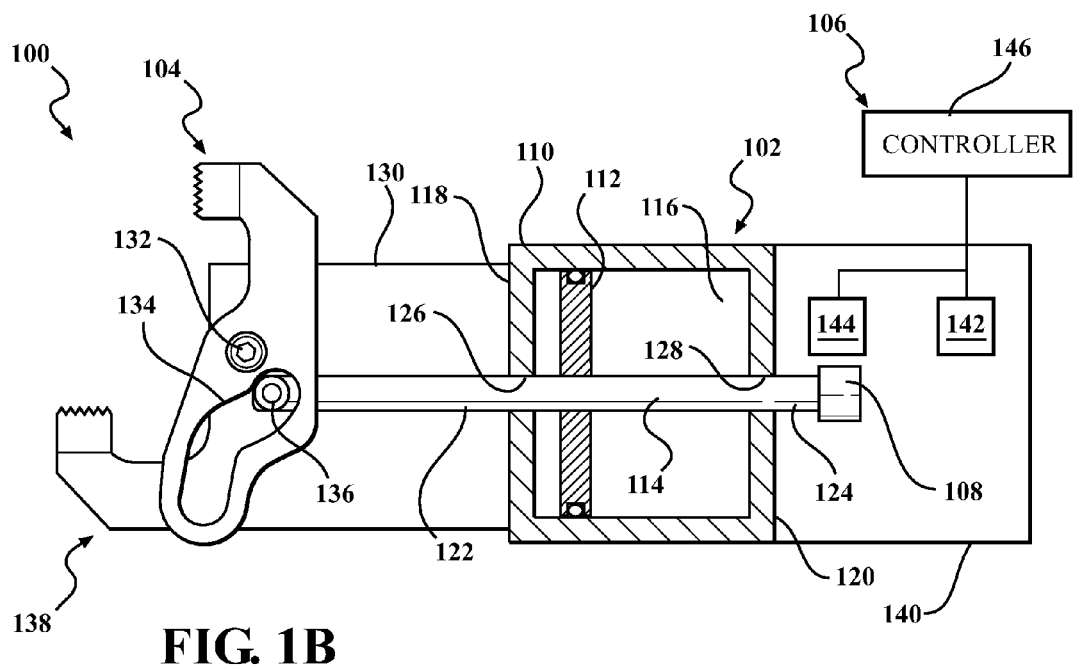

FIGS. 1A-1B show a gripper assembly 100. The gripper assembly 100 includes an actuator 102, at least one moveable gripper jaw 104, and a position sensing device 106. As will be explained in detail herein, at least a portion of the actuator 102 is moveable between a first position (FIG. 1A) and a second position (FIG. 1B). A sensor member 108 is coupled to a moveable portion of the actuator 102 for movement therewith, and the position sensing device 106 is operable to detect proximity of the sensor member 108.

The actuator 102 can be a pneumatic actuator that includes an actuator housing 110, a piston 112, and an actuator rod 114. Other types of actuators could be used, such as hydraulic actuators and electrical actuators. The actuator housing 110 can have a fixed position, and the actuator rod 114 is moveable with respect to the actuator housing 110.

The actuator housing 110 can be a substantially enclosed housing that defines an interior space 116. The actuator housing 110 can include a front portion 118 and a rear portion 120, such as a front wall and a rear wall of the actuator housing 110.

The piston 112 and at least a portion of the actuator rod 114 are disposed within the interior space 116 of the actuator housing 110. The piston 112 is connected to the actuator rod 114 such that the actuator rod 114 moves in response to movement of the piston 112. The piston 112 can be rigidly connected to the actuator rod 114 such that the piston 112 and the actuator rod 114 move in unison with one another. The actuator housing 110 can be substantially sealed to allow movement of the piston 112 within the interior space 116 in response to pneumatic pressurization or depressurization of the interior space 116 in front of and/or to the rear of the piston 112, for example, through entry and exit of compressed air through inlet and outlet ports (not shown in FIGS. IA-1B). This allows the piston 112 and the actuator rod 114 to move between a first position, wherein the piston 112 is disposed adjacent to the front portion 118, and a second position, wherein the piston 112 is positioned adjacent to the rear portion 120.

The actuator rod 114 is rigidly connected to the piston 112. The actuator rod 114 includes a first portion 122 and a second portion 124. The actuator rod 114 can be a single piece rod or can include multiple pieces that are rigidly connected to one another. In some examples, the first portion 122 and the second portion 124 are separate pieces that are both connected to the piston 112.

The first portion 122 of the actuator rod 114 extends through a first opening 126 that is defined by and extends through the front portion 118 of the actuator housing 110. The first portion 122 extends from the piston 112 to a first end of the actuator rod 114, and is located at least partially forward of the actuator housing 110. The second portion 124 of the actuator rod 114 extends through a second opening 128 that is defined by and extends through the rear portion 120 of the actuator housing 110. The second portion 124 extends from the piston 112 to a second end of the actuator rod 114, and is located at least partially rearward of the actuator housing 110.

The moveable gripper jaw 104 is connected to a support 130, also referred to herein as a gripper body, that is fixed with respect to the actuator housing 110 of the actuator 102. The support 130 is located forward of the actuator housing 110, and can be positioned adjacent to the front portion 118 of the actuator housing 110. The support 130 can be any type of structure that is adapted to support the moveable gripper jaw 104 with respect to the actuator housing 110. The support 130 can be a one-piece, unitary body that is formed from a single piece of material by operations such as casting, stamping, or milling.

The moveable gripper jaw 104 can be pivotally connected to the support 130 at a pivot joint 132. The pivot joint 132 can include a boss, pin, rod, bolt, or other structure that allows the moveable gripper jaw 104 to pivot with respect to the support 130. Connection of the moveable gripper jaw 104 to the support 130 by the pivot joint 132 allows the moveable gripper jaw 104 to pivot with respect to the support 130 and the actuator housing 110 of the actuator 102.

The moveable gripper jaw 104 is operably connected to the first portion 122 of the actuator rod 114 such that movement of the actuator rod 114 is operable to pivot the moveable gripper jaw 104. In the illustrated embodiment, the moveable gripper jaw 104 includes a cam slot 134. The cam slot 134 can extend completely through the moveable gripper jaw 104 or can be defined as a surface feature on the moveable gripper jaw 104. An engaging member such as a roller 136, a bushing, a rod or other structure is located at the first end of the actuator rod 114, and extends into the cam slot 134. As the actuator rod 114 moves between its first position and its second position, engagement of the roller 136 with the cam slot 134 causes the moveable gripper jaw 104 to move between a closed position (FIG. IA) and an open position (FIG. 1B).

In the illustrated embodiment, the gripper assembly 100 includes a fixed gripper jaw 138. When the moveable gripper jaw 104 is in the closed position, the moveable gripper jaw 104 is positioned adjacent to or in engagement with the fixed gripper jaw 138. As the moveable gripper jaw 104 moves toward the open position, it moves away from the fixed gripper jaw 138. The gripper assembly 100 need not include the fixed gripper jaw 138. As one example, the moveable gripper jaw 104 can be operable to define a closed position in which the moveable gripper jaw 104 is positioned adjacent to an external surface. As another example, the gripper assembly 100 can include two or more moveable gripper jaws.

The position sensing device 106 is located rearward from the actuator housing 110, and can be supported by a sensor housing 140, which is also referred to herein as a sensor mount. The sensor housing 140 can be fixed with respect to the actuator housing 110 and can be directly connected to the actuator housing 110. The sensor housing 140 can be any type of structure that is operable to support the position sensing device 106 with respect to the actuator housing 110. The sensor housing 140 can support the position sensing device 106 in a fixed position with respect to the actuator housing 110.

The position sensing device 106 is operable to determine the position of the moveable gripper jaw 104, for example, by detecting proximity of the sensor member 108, which is located on the second portion 124 of the actuator rod 114, and can be located at the second end of the actuator rod 114.

In the example shown in FIGS. 1A-1B, the position sensing device 106 includes a first sensor element 142, a second sensor element 144, and a controller 146. Each of the first sensor element 142 and the second sensor element 144 are operable to output signals to the controller 146 in response to proximity of the sensor member 108. As examples, the first sensor element 142 and the second sensor element 144 can be inductive sensors, Hall Effect sensors, reed switches, infrared sensors, optical sensors, or any other suitable type of sensor. The sensor member 108 is selected according to the mode of operation of the first sensor element 142 and the second sensor element 144. As examples, the sensor member 108 can be a metallic member if the first and second sensor elements 142, 144 are inductive sensors, can be magnetic members if the first and second sensor elements 142, 144 are hall effect sensors, or can be registration markings, reflective surfaces, or outer suitable indicia if the first and second sensor elements 142, 144 are infrared sensors or optical sensors.

When the actuator 102 moves to the first position, the moveable gripper jaw 104 is in the closed position, and the sensor member 108 is located adjacent to the first sensor element 142 of the position sensing device 106. The position sensing device 106 detects proximity of the sensor member 108 via the first sensor element 142, and outputs a corresponding signal of the controller 146. When the actuator 102 moves to the second position, the moveable gripper jaw 104 is in the open position, and the sensor member 108 is located adjacent to the second sensor element 144 of the position sensing device 106. The position sensing device 106 detects proximity of the sensor member 108 via the second sensor element 144, and outputs a corresponding signal of the controller 146. Based on the signals received from the position sensing device 106, the controller 146 outputs a signal representing the position of the moveable gripper jaw 104. The signal output by the controller 146 can indicate whether the moveable gripper jaw 104 is in proximity of the first sensor element 142 or in proximity of the second sensor element 144.

In the foregoing example, elements that are rigidly connected to one another could, in alternative configurations, be formed as unitary structures. As an example, the actuator housing 110 and the sensor housing 140 could be formed as a single-piece, unitary structure. Other configurations that combine two or more of the structures described herein as a unitary member are also possible.

Figure 2A:
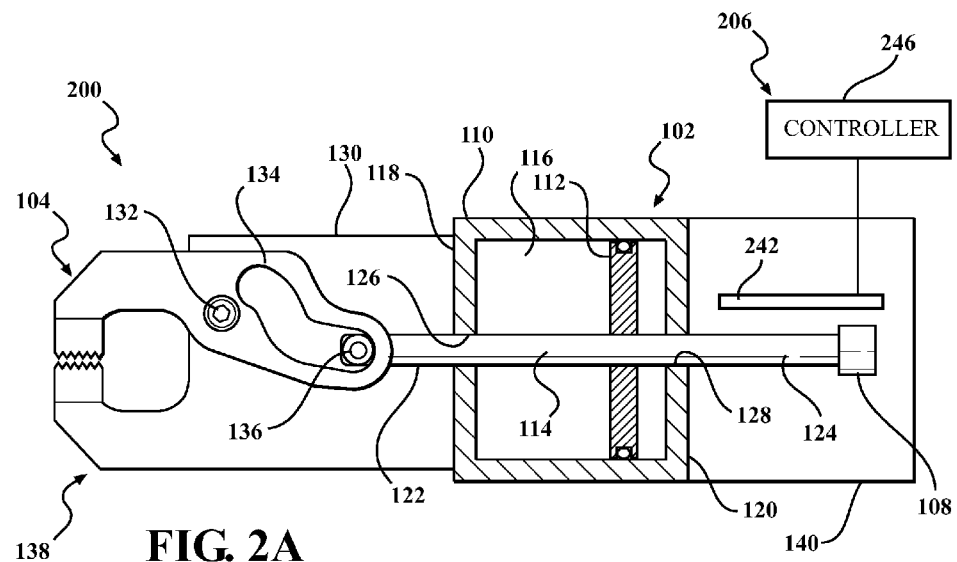
FIGS. 2A-2B are illustrations showing a gripper assembly that incorporates a position sensing device according to a second example.
Figure 2B:
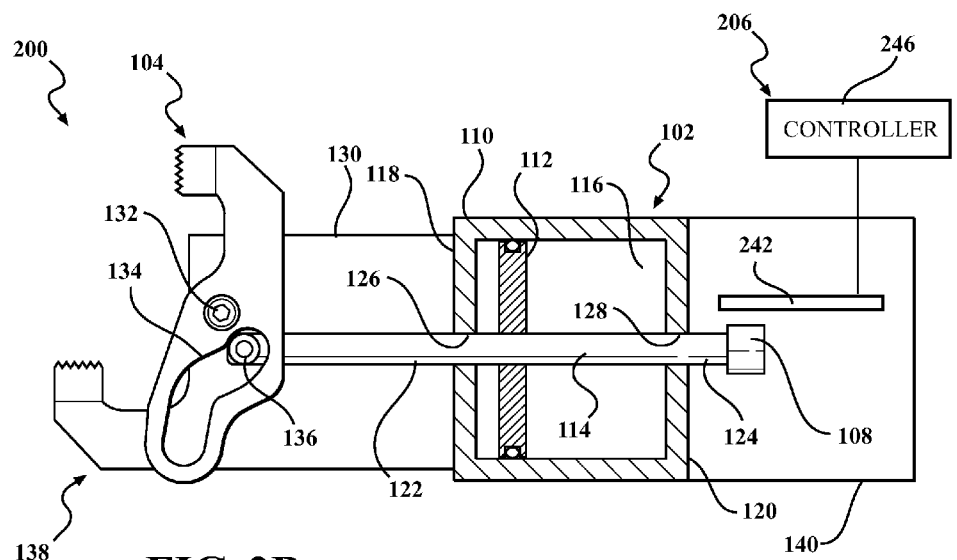

A gripper assembly 200 according to a second example, as shown in FIGS. 2A-2B, is identical to the gripper assembly 100 except that the position sensing device 106 is replaced by a position sensing device 206 that includes a sensor element 242 and a controller 246 that are operable to detect proximity and position of the sensor member 108. As one example, the sensor element 242 can include a sensor that outputs a variable signal based on and/or proportional to the position of the sensor member 108 with respect to the sensor element 242. As another example, the sensor element 242 can include an array of sensors that output one or more signals that, taken together, can be used as a basis for determining the position of the sensor member 108 with respect to the sensor element 242. The signals output by the sensor element 242 are received by the controller 246 and are used as a basis for determining the position of the sensor member 108 with respect to the sensor element, which can be used to output a signal representing the position of the moveable gripper jaw 104. The remainder of the components of the gripper assembly 200 are identical to like-numbered components of the gripper assembly 100.

Figure 3:
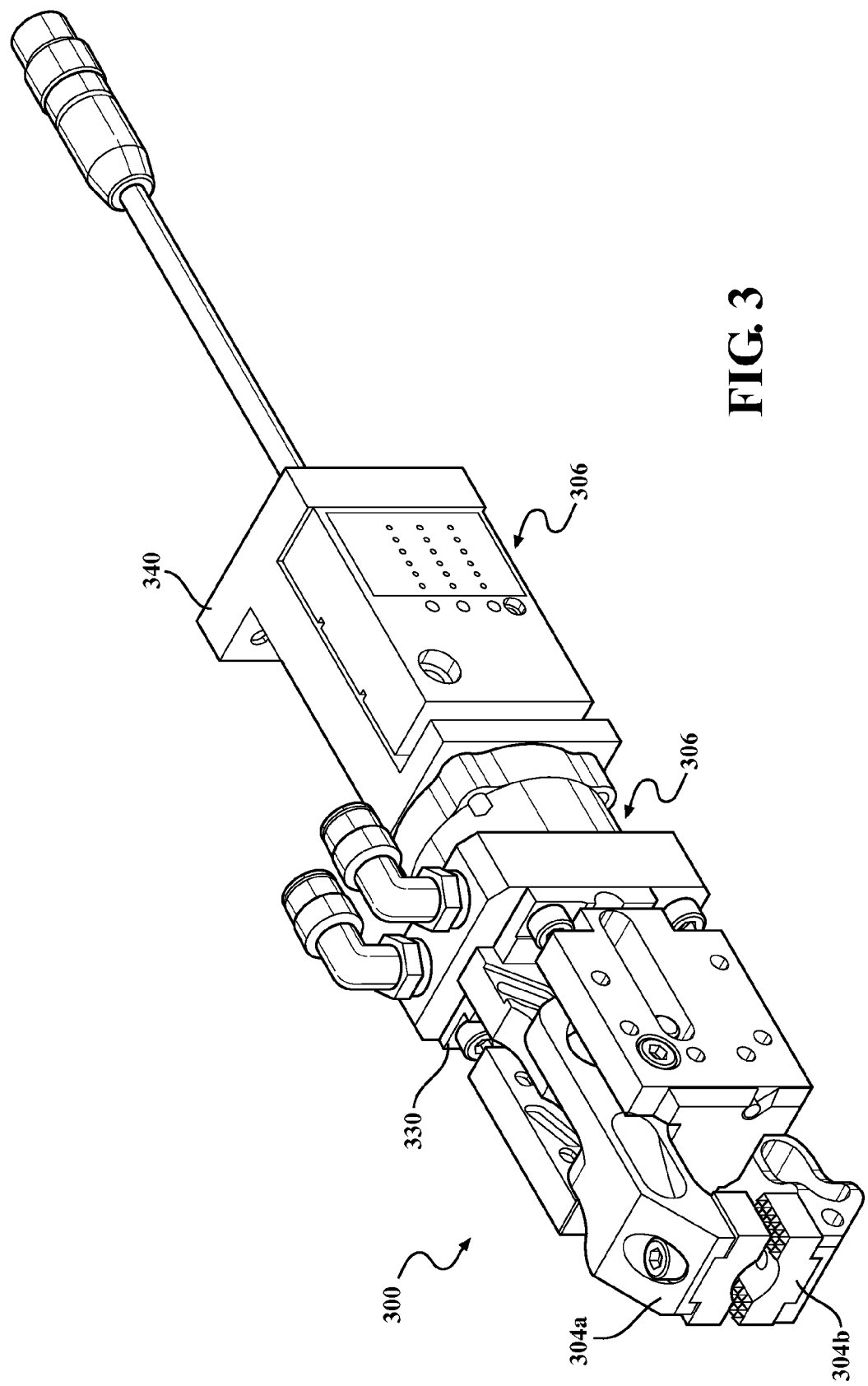
FIG. 3 is a perspective view showing a gripper assembly that incorporates a position sensing device according to a third example.
Figure 4:
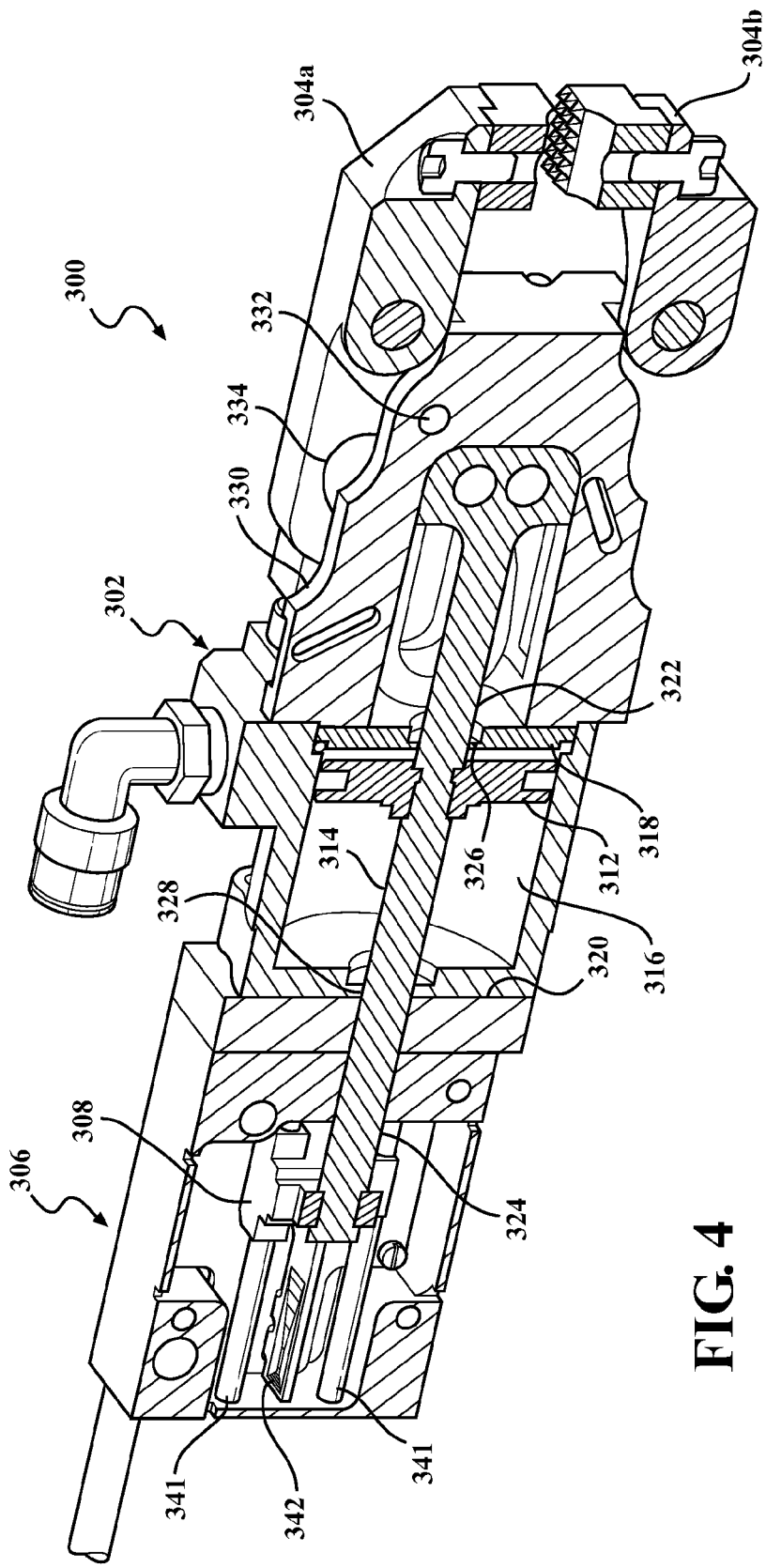
FIG. 4 is a cross-section view showing the gripper assembly of FIG. 3.

FIGS. 3-4 show a gripper assembly 300 according to a third example. The gripper assembly 300 is similar to the gripper assembly 100 and the gripper assembly 200. The gripper assembly 300 includes an actuator 302, a first moveable gripper jaw 304a, a second moveable gripper jaw 304b, and a position sensing device 306.

The actuator 302 includes an actuator housing 310, a piston 312, and an actuator rod 114. The actuator housing 310 has a front portion 318 with a first opening 326 and a rear portion 320 with a second opening 328. The actuator rod 314 has a first portion 322 and a second portion 324. The structural relationship between these components is analogous to that of similar components of the gripper assembly 100.

The first and second moveable gripper jaws 304a, 304b are pivotally connected to a support 330 by pivot joints 332, and are coupled to engaging members 336 of the actuator rod 314 at cam slots 334.

The position sensing device 306 is supported by a sensor housing 340. The sensor member 308 can be supported by linear rails 341 for movement with respect to a sensor element 342 in the form of, for example, one or more inductor coils formed on a circuit board.

Operation of the gripper assembly 300 is similar to the operation of the gripper assembly 100, as described above.

Figure 5:
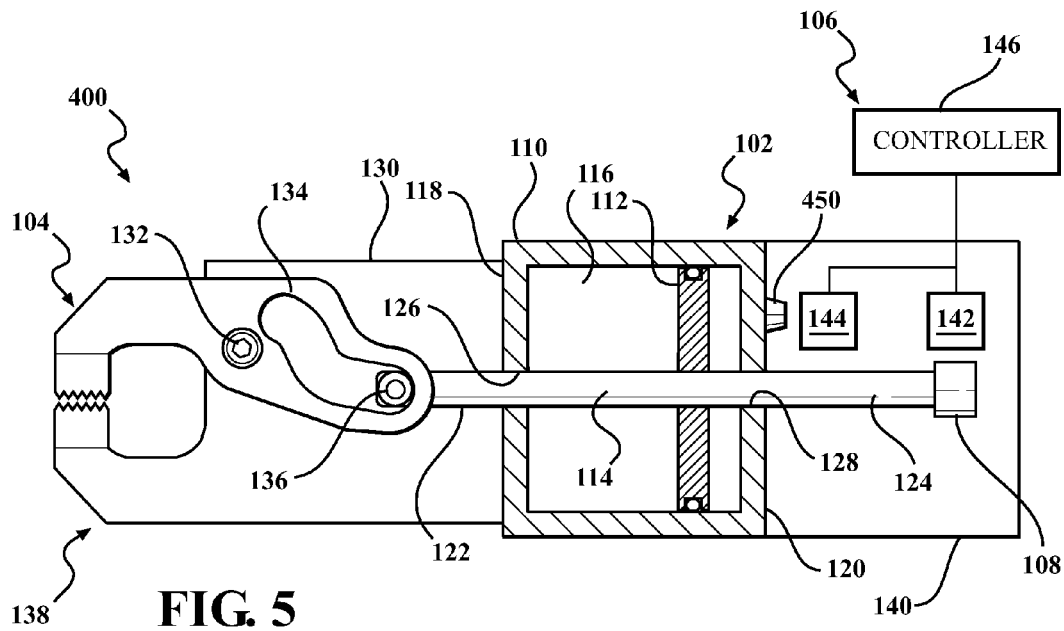
FIG. 5 is an illustration showing a gripper assembly that incorporates a position sensing device according to a fourth example.

FIG. 5 shows a gripper assembly 400 according to a fourth example. The gripper assembly 400 is similar to the gripper assembly 100, as described above, and like reference numerals denote like parts. The gripper assembly 400 includes a cooling port 450. The cooling port 450 is operable to direct a stream of gas, such as air, toward at least a portion of the position sensing device 106, such as the first sensor element 142 or the second sensor element 144 thereof. The stream of air can be compressed air from a compressed air source. In the illustrated example, the cooling port 450 is in communication with the interior space 116 of the actuator housing 110 to receive exhaust air from the actuator housing 110. Thus, as air is exhausted from the interior space 116 during movement of the piston 112 between the first and second positions, the exhaust air is directed to the position sensing device 106. By directing air to the position sensing device 106 via the cooling port 450, heat can be dissipated from the position sensing device 106.

Figure 7:
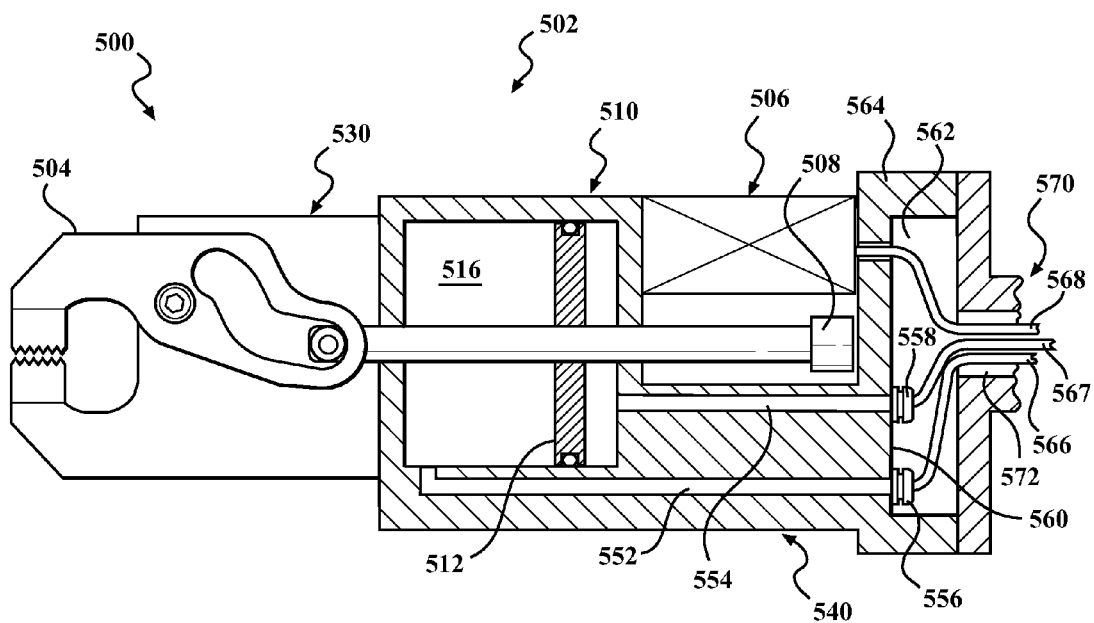
FIG. 7 is a cross-section view showing the gripper assembly of FIG. 6.
Figure 6:
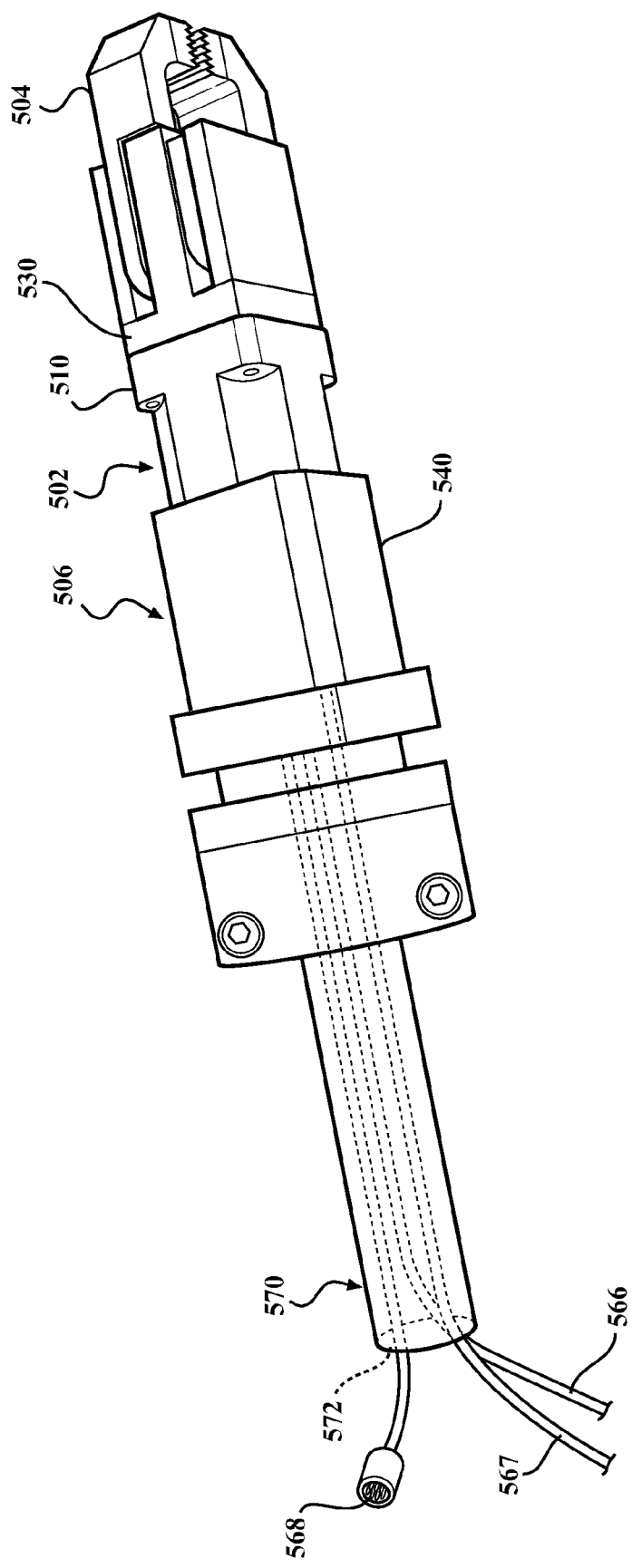
FIG. 6 is a perspective view showing a gripper assembly according to a fifth example.

FIGS. 6-7 show a gripper assembly 500 according to a fifth example. The gripper assembly 500 includes an actuator 502, at least one moveable gripper jaw 504, a position sensing device 506, a sensor member 508, an actuator housing 510, a piston 512, an actuator rod, a support 530 on which the at least one moveable gripper jaw 504 is pivotally mounted, and a sensor housing 540 that supports the position sensing device 506 at a location that is at an opposite side of the actuator housing 510 with respect to the support 530 and the at least one moveable gripper jaw 504. All of these components are as described with respect to similarly-named parts of the first through fourth examples of FIGS. 1-5, except as described below.

One or more pneumatic passageways, such as a first passageway 552 and a second passageway 554 are formed in one or both of the actuator housing 510 and the sensor housing 540. The first passageway 552 and the second passageway 554 are formed internally with respect to the actuator housing and/or the sensor housing. The actuator housing 510 and/or the sensor housing 540 can be formed from metals, such as steel or aluminum, and the first and second passageways can be formed therein by operations such as machining or drilling.

The actuator housing 510 and the sensor housing 540 can, as noted previously, be formed separately or as a unitary structure. As an example, the actuator housing 510 and the sensor housing 540 can be portions of a unitary structure having the first passageway 552 and the second passageway 554 formed therein.

The first and second passageways 552, 554 are in communication with an interior space 516 of the actuator housing 510, and extend from the interior space 516 to outlets, such as ports 556, 558 that are located rearward of the actuator housing 510 and can also be located rearward of the sensor housing 540. As an example, the ports 556, 558 can be located on a rear wall 560 of the sensor housing 540, in a protected area 562 that is bounded by a peripheral wall 564. Pneumatic lines 566, 567 can be connected to the ports 556, 558 and located at least partially within the protected area 562. A sensor cable 568 that is electrically connected to the position sensing device 506 for transmitting a position signal can extend through the rear wall 560 into the protected area 562.

A mounting member, such as a tooling arm 570, can be connected to the sensor housing 540 adjacent to the rear wall 560 thereof such that the protected area 562 is in communication with an internal bore 572 of the tooling arm 570. The pneumatic lines 566, 567 and the sensor cable 568 can be routed within the internal bore 572 of the tooling arm. Thus, the pneumatic lines 566, 567 and the sensor cable 568 are protected from environmental conditions external to the gripper assembly 500. Also, the flow of pressurized air through the first and second passageways 552, 554 can be operable to cool the actuator housing 510 and/or the sensor housing 540 when the gripper assembly 500 is utilized in a high-heat environment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A gripper assembly comprising:
   an actuator having a fixed portion that defines an interior space, a first actuator portion that is at least partially disposed within the interior space and extends through a first aperture that is formed through the fixed portion, and a second actuator portion that is at least partially disposed within the interior space and extends through a second aperture that is formed through the fixed portion, wherein the first actuator portion and the second actuator portion are moveable in unison between a first position and a second position;
   at least one gripper jaw that is disposed forward of the fixed portion of the actuator and is moveable with respect to the fixed portion of the actuator in response to movement of the first actuator portion between the first position and the second position;
   a sensor member that is disposed outside of the interior space and rearward of the fixed portion of the actuator and is coupled to the second actuator portion for movement therewith; and
   a position sensing device that is disposed outside of the interior space and rearward of the fixed portion of the actuator and is operable to detect proximity of the sensor member.

2. The gripper assembly of claim 1, wherein the first aperture is defined through a front wall of the fixed portion of the actuator, the second aperture is formed through a rear wall of the fixed portion of the actuator, the first actuator portion extends forward from the front wall of the fixed portion of the actuator and the second actuator portion extends rearward from the rear wall of the fixed portion of the actuator.

3. The gripper assembly of claim 1, wherein the position sensing device includes a first sensor element and a second sensor element that are spaced from one another in a direction of travel of the sensor member.

4. The gripper assembly of claim 3, wherein the first sensor element of the position sensing device detects proximity of the sensor member when the second actuator portion is in the first position and the second sensor element of the position sensing device detects proximity of the sensor member when the second actuator portion is in the second position.

5. The gripper assembly of claim 1, wherein the position sensing device includes an array of sensor elements that output one or more signals indicative of the position of the sensor member with respect to the position sensing device.

6. The gripper assembly of claim 1, wherein the position sensing device is operable to output a signal that changes in proportion to changes to the position of the sensor member with respect to the position sensing device.

7. The gripper assembly of claim 1, further comprising:
   a port that is operable to direct a stream of gas toward at least a portion of the position sensing device.

8. The gripper assembly of claim 7, wherein the actuator is a pneumatic actuator, the port is in communication with an interior of the actuator, and the stream of gas is exhaust from the actuator.

9. The gripper assembly of claim 1, wherein the actuator is at least one of a pneumatic actuator, a hydraulic actuator, or an electrical actuator.

10. The gripper assembly of claim 1, further comprising:
    a sensor mount that is disposed rearward of the actuator, is connected to the fixed portion of the actuator, and supports the position sensing device with respect to the fixed portion of the actuator.

11. The gripper assembly of claim 10, wherein the actuator is a pneumatic actuator, and at least one pneumatic passageway is formed though the sensor mount and is in communication with the actuator.

12. The gripper assembly of claim 11, wherein the at least one pneumatic passageway is in communication with at least one pneumatic port that is located on a rear wall of the sensor mount, in a protected area that is bounded by a peripheral wall.

13. The gripper assembly of claim 1, wherein the position sensing device includes at least one of an inductive sensor, a hall effect sensor, a reed switch, an infrared sensor, or an optical sensor.

14. The gripper assembly of claim 1, wherein the sensor member includes at least one of a metallic member, a magnetic member, a registration marking, a reflective surface, or indicia.

15. The gripper assembly of claim 1, wherein the fixed portion of the actuator includes an actuator housing.

16. The gripper assembly of claim 1, wherein the actuator includes a piston that is disposed within the interior space, coupled to the first actuator portion, and coupled to the second actuator portion.

17. A gripper assembly comprising:
    a pneumatic actuator having an actuator housing that defines an interior space, a piston disposed within the actuator housing, a first elongate rod portion that is coupled to the piston and extends forward from the piston and through a first aperture that is formed in a front portion of the actuator housing, and a second elongate rod portion that is coupled to the piston and extends rearward from the piston and through a second aperture formed through a rear portion of the actuator housing, wherein the first elongate rod portion and the second elongate rod portion are moveable in unison between a first position and a second position;
    a gripper body that is fixedly connected to the actuator housing;
    at least one gripper jaw that is pivotally connected to the gripper body and is moveable with respect to the gripper body in response to movement of the first elongate rod portion between the first position and the second position;
    a sensor member that is disposed outside of and rearward of the actuator housing and is coupled to the second elongate rod portion for movement therewith;

a sensor mount that is fixedly connected to the actuator housing; and a position sensing device that is connected to the sensor mount and is operable to detect proximity of the sensor member.

18. The gripper assembly of claim 17, wherein the gripper body is positioned adjacent to the front portion of the actuator housing.

19. The gripper assembly of claim 17, wherein the sensor mount is positioned adjacent to the rear portion of the actuator housing.

20. The gripper assembly of claim 17, further comprising:

a cooling port that is operable to direct a stream of gas toward at least a portion of the position sensing device for dissipating heat from the position sensing device.

* * * * *

UNITED STATES PATENT AND TRADEMARK OFFICE
CERTIFICATE OF CORRECTION

| | | |
|---|---|---|
| PATENT NO. | : 8,919,844 B1 | Page 1 of 1 |
| APPLICATION NO. | : 13/896641 | |
| DATED | : December 30, 2014 | |
| INVENTOR(S) | : Mascorro et al. | |

It is certified that error appears in the above-identified patent and that said Letters Patent is hereby corrected as shown below:

IN THE SPECIFICATION

1. In Column 3, Line 33, please change "IA" to --1A--; and

2. In Column 4, Line 23, please change "IA" to --1A--.

Signed and Sealed this
Twenty-first Day of April, 2015

Michelle K. Lee
*Director of the United States Patent and Trademark Office*